US007579299B2

(12) United States Patent
Flessner et al.

(10) Patent No.: US 7,579,299 B2
(45) Date of Patent: Aug. 25, 2009

(54) SEMI-SYNTHETIC BLEACHING EARTH

(75) Inventors: Uwe Flessner, Neuried (DE); José Antonio Ortiz Niembro, Puebla (MX); Klaus Schurz, München (DE); Werner Zschau, Steinebach (DE)

(73) Assignee: Sud-Chemie AG, Munich (DE)

( * ) Notice: Subject to any disclaimer, the term of this patent is extended or adjusted under 35 U.S.C. 154(b) by 597 days.

(21) Appl. No.: 11/290,674

(22) Filed: Nov. 30, 2005

(65) Prior Publication Data
US 2006/0128564 A1 Jun. 15, 2006

Related U.S. Application Data

(63) Continuation-in-part of application No. PCT/EP2004/005788, filed on May 28, 2004.

(30) Foreign Application Priority Data

May 30, 2003 (DE) ................. 103 24 561

(51) Int. Cl.
*B01J 20/12* (2006.01)
*B01J 20/30* (2006.01)
*C01B 33/40* (2006.01)

(52) U.S. Cl. .............. 502/408; 502/407; 502/411; 502/414; 502/81; 502/82; 502/85; 423/327.1; 423/328.1; 423/330.1; 423/333

(58) Field of Classification Search ............. 423/327.1, 423/328.1, 330.1, 332, 333; 502/407, 408, 502/411, 414, 81, 82, 83, 84, 85
See application file for complete search history.

(56) References Cited

U.S. PATENT DOCUMENTS

| 3,755,183 | A |   | 8/1973  | Fahn |
|-----------|---|---|---------|------|
| 3,837,872 | A | * | 9/1974  | Conner ................ 588/252 |
| 4,033,873 | A | * | 7/1977  | Stoltenberg ................ 210/186 |
| 4,055,622 | A | * | 10/1977 | Christophliemk et al. ... 423/700 |
| 5,008,226 | A |   | 4/1991  | Taylor |
| 5,008,227 | A | * | 4/1991  | Taylor et al. ................ 502/83 |
| 5,814,209 | A |   | 9/1998  | Hahn |
| 5,869,415 | A | * | 2/1999  | Ortiz et al. ................ 502/81 |

FOREIGN PATENT DOCUMENTS

| DE | 19635730    | 9/1999  |
| EP | 0185182     | 6/1986  |
| EP | 0234221     | 9/1987  |
| EP | 0361622     | 4/1990  |
| EP | 0389057     | 9/1990  |
| GB | 1337301     | 11/1973 |
| WO | WO 95/11199 | 4/1995  |

* cited by examiner

*Primary Examiner*—Ngoc-Yen M Nguyen
(74) *Attorney, Agent, or Firm*—Scott R. Cox

(57) ABSTRACT

The invention relates to a process of processing an acid suspension containing at least one solid, wherein (a) the suspension containing at least one solid is mixed with an alkali metal silicate solution, the pH of the mixture being adjusted to a pH of more than 4, and (b) the resulting precipitate which contains the alkali metal silicate and the at least one solid is separated and optionally washed, dried and ground. The mixture according to (a) after aging may be acidified further by the addition of an acid. Furthermore, there are disclosed an adsorbent obtainable according to the preceding process, and the use thereof.

20 Claims, No Drawings

SEMI-SYNTHETIC BLEACHING EARTH

CROSS REFERENCE TO RELATED APPLICATIONS

This is a continuation-in-part application of International Application PCT/EP 2004/005788 filed on May 28, 2004 and which designated the United States.

DESCRIPTION

This invention relates to a process for the precipitation of a precipitate from an acid suspension containing at least one solid, an adsorbent obtainable by this process, and the use of this adsorbent, in particular as bleaching earth or as degumming aid.

Vegetable and animal oils and fats, as a rule, cannot be used immediately after they have been obtained because they still contain concomitant substances which adversely affect the taste, the smell, the appearance or the storage stability. Therefore, in particular with vegetable oils, these undesirable concomitant substances are removed in a multi-stage raffination process. This raffination process consists of a combination of physical treatments, e.g. filtration, drying or steam destillation, with chemical treatment methods, e.g. treatment with acids or bases and/or treatment with adsorbents and catalysts. Important steps of this raffination process are the so-called "degumming" and the so-called "bleaching".

In the degumming process, water-soluble concomitant substances of the oil, e.g. phospholipids, are removed. For this purpose, the raw oil is mixed with water and optionally with a mild acid, e.g. citric acid or phosphoric acid, and, after a certain interaction time, the aqueous phase is separated from the oil. For the degumming silica gels having a high water content are also used which, in particular, can effect an improved phospholipid reduction in the oil. Generally, highly active bleaching earths may not be used as degumming agents because their adsorption power is insufficient under the conditions of the degumming process.

After degumming, the heated oil is mixed with bleaching earths for discoloration and for the adsorption of undesirable concomitant substances. Bleaching earths are mostly alumosilicates which are produced by thermal activation or by activation with acids from naturally occurring materials, e.g. montmorillonite or attapulgite. Fully-synthetic materials on the basis of alumosilicates are also known. The treatment with bleaching earths in many cases is a key step of the raffination, because a plurality of undesirable concomitant substances may be adsorptively removed or converted into tolerable substances by a catalytic reaction in a single step.

For degumming or bleaching, synthetic adsorbents are used as well as adsorbents which are derived from naturally occurring minerals.

Synthetic bleaching earths are generally produced by precipitation of water glass with acids in the presence of aluminium salts. In order to obtain a porous product by this process, the precipitation must be carried out under controlled conditions, mostly in diluted solutions. A gel-like product is obtained which may be washed salt-free only with great efforts and by using large amounts of water. In order to obtain a sufficient bleaching activity, it is also necessary to convert the products into active alumosilicates by spray-drying and subsequent calcination.

The production of such synthetic bleaching earths is disclosed, for example, in EP 938 375 A1. At first, a water glass solution is acidified until the formation of a hydrogel, and the hydrogel is then mixed with a solution of divalent or polyvalent metals. The metal salts are mostly salts of iron and aluminium. After mixing, the pH is raised by the addition of alkali until a precipitate is formed. The precipitate is separated from the solution and washed. The washed precipitate is then dried and optionally calcined. Before drying, the washed precipitate may also be re-suspended and then spray-dried. The spray-dried product is calcined at about 450° C. until a residual water content of about 0.5 to 2 weight % is obtained. Due to the complicated manufacturing process, the strongly diluted solutions and the high salt loads in the waste water and the amount of energy used for spray-drying and calcining, such synthetic bleaching earths are very expensive and have so far not been widely used.

The adsorbents on the basis of silica gels used for degumming are produced by precipitation from pure water glass solutions. A precipitate is also formed which was must be washed salt-free with high effort. The silica gel obtained by the precipitation must also be converted into stable, high-surface and highly porous silicate by spray-drying and calcinations processes. The production and use of such silica gels is disclosed in the documents EP 185 182, EP 234 221, EP 361 622 and EP 389 057.

At present, bleaching earths are used for bleaching which essentially have been produced from montmorillonite. Montmorillonite is a layered alumosilicate which has a low porosity and surface area. In order to obtain a highly active bleaching earth, the raw clay is purified, suspended in strong inorganic acids and leached at increased temperatures. During this treatment, components are dissolved out of the mineral and large amounts of salt-containing waste water are produced which must be disposed of. Depending on the quality of the raw clay used, bleaching earths are obtained which mostly universally may be used for the upgrading of different oils, e.g. rape, linseed or sunflower oil and which achieve an at least sufficient bleaching action. In order to obtain particularly highly active systems, both the raw clay used and the activation process has to be adapted to the oil to be bleached. The waste waters obtained with the bleaching of the raw clay with acid and during the washing of the leached raw clay may be used, for example, as precipitation aids, due to their contents of aluminium ions. However, the content of the aluminium ions in the wash solutions decreasing rapidly during washing so that these washing waste waters can no longer be processed to commercial products and must therefore be disposed of. To this end, the aluminium and iron ions contained in the washing solution are precipitated by means of lime milk. The remaining water-soluble salts must then be disposed of according to the applicable legal requirements.

In order to solve the problem of the waste water disposal, activation processes have been developed in which no waste waters are produced. Accordingly, U.S. Pat. No. 5,008,226 discloses a process in which a naturally occurring raw clay having a high content of palygorskite is activated by spraying with up to 10 weight % sulphuric acid. No washing steps are necessary at all and therefore no acid waste waters are formed. The disadvantage of this process is that only certain raw clays may be used for this kind of activation, and the products obtained thereby must always be closely adapted to one application. They generally have bleaching activities which are too low in order to be used for the bleaching of different oils.

In particular, if different oils are used in a plant, the individual charges of which are not so large that the storage of specially tuned bleaching earths is economically justified, highly active bleaching earths are used which have a substantially broader application spectrum. The manufacture of highly active bleaching earths by leaching with strong acids, therefore, continues to have a high significance. Thus, the waste water problem remains relevant.

For the treatment of the waste water from the bleaching earth production, the acid solutions, as described above, are mostly neutralized and the metal salt ions contained therein are precipitated.

DE 20 36 819 discloses a process for the preparation of silicatic adsorption and drying agents. Homogeneous precipitation products are produced from solutions of salts with di- and/or trivalent cations with aqueous alkali metal silicate solutions. The solutions contain $Fe^{2+}$, $Mg^{2+}$, $Zn^{2+}$, $Mn^{2+}$, $Al^{3+}$ and/or $Fe^{3+}$ as cations. The alkali silicate metal solution is either a sodium or potassium water glass solution which is preferably used in a 0.6 to 1.4 molar concentration. The precipitation products are then essentially liberated from alkali ions by washing, and are dried at temperatures of not more than 130° C.

According to EP 938 375, a salt-containing solution as is formed, for example, during the manufacture of bleaching earths, is reacted to form a synthetic bleaching earth product by precipitation with water glass. Due to the use of water glass, the performance of the process is complicated due to the formation of gels, and can be handled only in diluted solutions. This process also requires spray-drying and calcination in order to obtain active bleaching earth systems.

WO 95/11199 discloses the treatment of acid waste water from the production of bleaching earth by precipitation with a base and separating the solids formed thereby. As bases there are used magnesium salts, preferably magnesite. The filter cakes thus obtained are subsequently dissolved by treating with dilute sulphuric acid, resulting in a product which may be used as a precipitation aid in the waste water treatment.

DE 43 06 663 discloses a process for environmentally friendly processing of acid waste water, thereby obtaining a sorbent. For that purpose an acid waste water from the bleaching earth production is reacted with an alkali metal silicate solution, the obtained precipitate is separated from the aqueous phase and optionally purified and dried. The obtained sorbent may be used for the bleaching of oils or for the removal of soaps, phospholipids and heavy metals from oils, in particular edible oils.

DE 21 00 627 discloses a process for compacting waste. After destruction of solid components the waste is treated with an aqueous solution of an alkali metal silicate as a binding agent. The destruction of solid matter is performed mechanically. The waste is treated with such amounts of the aqueous solution of the alkali metal silicate and a silicate hardening agent, that by reaction of both components a product is obtained that is chemically and physically inert, solid and almost insolubl in water. Before compaction the waste material may be deposited on soil in a liquid state, on which a solidification takes place after deposition.

In summary, it can be stated that synthetic adsorbents, due to their complicated manufacture and the high costs associated therewith, can be used as degumming agents or as bleaching earth on a large technical scale only in selected cases. In spite of the large amounts of waste water produced during the preparation, the bleaching earths which are preferably used are on the basis of montmorillonitic minerals. Processes for the production of bleaching earths which avoid the formation of waste waters as well as processes for the recovery of the resulting waste waters do not lead to products which have an activity comparing to that of highly active bleaching earths or they can be produced with similar high efforts and costs as synthetic bleaching earths.

The problem of disposing large amounts of acid waste waters containing large amounts of metal ions occurs not only in the manufacture of highly active bleaching earths, but in a more generally sense if minerals are leached with strong acids. Comparable difficulties exist, for example, also in the production of titanium dioxide, in which minerals are leached using sulphuric acid.

The invention is therefore directed to solving the problem to provide a process for the recovery of acid suspensions whereby, on the one hand, valuable products are obtained which may be recycled into the economic cycle and, on the other hand, waste waters are obtained which may be disposed of simply and with little costs, and which especially have a minimum salt load.

This problem is solved by a process with the features of claim 1. Advantageous developments of the process of the invention are recited in the dependent claims.

In the process according to the present invention for the recovery of an acid suspension containing at least one solid, first the acid suspension containing at least one solid which usually has a pH of less than 5, preferably less than 3, in particularly less than 1, is mixed with a alkali metal silicate solution, whereby a pH of more than about 4, preferably of more than about 5 and most preferably more than about 6 is set in order to obtain a precipitate containing the alkali metal silicate and at least one solid. The formation of the precipitate generally takes place between pH 8 and pH 6. The starting alkali metal silicate solution generally has a pH of more than 10, in particularly of more than 12.

According to a particularly preferred embodiment of the invention, the acid suspension containing at least one solid is added or titrated to an alkali metal silicate solution. Preferably, the mixing is carried at an increased temperature, especially at more than 70° C. Both a heated acid suspension containing at least one solid and/or a heated alkali metal silicate solution can be used, for example.

According to a preferred embodiment of the invention, the above mixture, preferably after an aging or stabilization step, is further acidified by adding an acid to a pH of less than 4, in particular less than 3. The aging or stabilization step serves for the stabilization of the precipitate formed, wherein the mixture is stirred or allowed to stand for some time, preferably at least 1 hour, for example 1 to 2 hours. During the aging or stabilization step, the temperature is preferably maintained above 70° C. For example, the mixture according to claim 1(a) may also be brought to boiling. After the precipitation, the precipitate containing the alkali metal silicate and the solid material is separated, optionally washed, dried and ground. Thus, the precipitate is a semi-synthetic product because it includes a portion based on the solid contained in the suspension, on the one hand, and a portion, which is based on the precipitation of silicic acid and optionally of the dissolved ions contained in the suspension. The last portion thus forms a "synthetic" portion, whereas the first portion is based on natural sources, such as natural clays. However, the solid must not have a natural origin. It is also possible that the solid has been formed in a previous synthesis step.

According to the process of the present invention, a well-filterable precipitate is obtained, and there are no difficulties during the separation of the precipitate or during the washing-out of, for example, the alkali metal ions, such difficulties usually occurring in the processing of gels. The precipitate has a high porosity and a high specific surface area such that an adsorbent having a high bleaching activity is obtained by simple drying without the necessity of calcining the precipitate. This amounts to a substantial saving in energy and a cost reduction. Furthermore, when carrying out the process, waste waters are obtained which have a comparably low salt load whereby the disposal is substantially facilitated. Due to their low acid content, the suspensions and the waste waters have significantly lower corrosive properties.

The process according to the present invention is, per se, suitable for the processing of any other acid suspensions. Such acid suspensions are obtained in technical processes, e.g. during the leaching of minerals with acid. Examples for such technical processes are the production of titanium dioxide or the production of bleaching earths. Here, minerals are decomposed with strong acids, mostly sulphuric acid or hydrochloric acid, whereby large amounts of acid waste waters are formed.

An acid suspension containing at least one solid is understood to be a suspension of at least one solid in a solvent, mostly water, which has an acid pH, preferably a pH of less than 3, most preferably of less than 1. The pH is preferably adjusted by the addition of acid. In principle, there are no limitations with respect to the selection of the acid and the solid(s).

The acid suspension containing at least one solid is mixed with an aqueous alkali metal silicate solution. The alkali metal silicate solution is, as pointed out above, strongly basic, such that, by the addition of the suspension containing a solid, the acid contained in such suspension is at least partially neutralized. Generally, water glass is used as the alkali metal silicate solution, in particular a sodium water glass and/or a potassium water glass. The alkali metal silicate solution is preferably used in diluted form in order to obtain a uniform precipitation. Preferably, the alkali metal silicate solution has a solids content of at least about 2 weight %, more preferably of at least about 5 weight %. The mixing of the acid suspension containing at least one solid and the alkali metal silicate solution is carried out such that the pH of the mixture has a value of more than about 4, preferably of more than about 5 and most preferably of more than about 6. Optionally, an acid or an alkaline substance may be added. Preferably, the pH of the mixture is not above pH 8, in particular not above pH 10. According to a preferred embodiment, the addition of the acid suspension containing at least one solid to the alkali metal silicate solution is carried out during a time until the pH of the mixture has a value of more than about 4, in particular of more than about 5 and most preferably of more than about 6.

After the formation of the precipitate containing the alkali metal silicate and the solid, the mixture, according to a preferred embodiment of the invention, is re-acidified by the addition of an acid, i.e. the pH is further reduced to values of less than 4, preferably less than 3. To this end, any acid may be used. Mineral acids, such as sulphuric acid, hydrochloric acid or nitric acid, are particularly suitable.

It has been surprisingly found that the acidification facilitates the washing of the precipitate which is optionally carried out in a later production step. Furthermore, it was unexpectedly found that the re-acidification has a positive effect on the properties of the product, in particular with respect to the bleaching and degumming activity of the product.

According to a preferred embodiment, the precipitation is carried out at increased temperatures, in particular at temperatures above 70° C. This may also be done by using a hot starting suspension containing at least one solid, or with a hot alkali metal silicate solution. After re-acidification, the mixture is preferably heated. Preferably, the suspension is maintained at a temperature of more than 70° C. Most preferably, this part of the reaction is conducted such that the suspension is heated to boiling. The time during which the acidified mixture is heated depends on the size of the batch and on the concentration of the components in the suspension. The suitable time can be simply determined by a person skilled in the art by taking samples. Generally, the acidified mixture is heated for at least 2 hours. For technical applications, reaction times in the range of more than 3 hours are generally selected.

The precipitate containing the alkali metal silicate and the solid(s) is separated in a manner known to the person skilled in the art. This is usually done by filtration. However, other separation processes may also be used, for example a separation by sedimentation or by centrifugation. Since the precipitate formed during the process of the invention is made up of fine grains, i.e. no gel is formed in contrast to the above-mentioned processes, the filtration may be carried out in a relatively short time. No spray-drying as it is necessary in the prior art processes or the processing of waste waters for the preparation of artificial silicates is necessary in the process according to the invention. However, spray-drying is not excluded. The filter cake is further processed in the usual manner and, for example, washed and dried. Mostly, it is dried to a water content of less than 40 weight %, preferably of less than 30 weight %. The dried filter cake can then be ground to the desired fineness using common equipment.

Preferably, the acid suspension containing at least one solid contains metal ions with a valency of at least 2 in dissolved form. These metal ions are, for example, dissolved when minerals are leached with strong acids. By reaction with the alkali metal silicate, these metal ions are then precipitated and thus removed from the solution. The solid particles contained in the suspension probably act as crystallization nuclei so that a fine-particle, filterable precipitate is obtained. Divalent and trivalent ions which may be contained in the aqueous phase of the suspension are for example $Fe^{2+}$, $Mg^{2+}$, $Zn^{2+}$, $Mn^{2+}$, $Al^{3+}$ and/or $Fe^{3+}$. The concentration of the divalent and/or trivalent ions depends on the preparation of the suspension, for example on the duration and on the conditions under which the clays are leached with acid. The concentration of the divalent and/or trivalent ions can, for instance, correspond to a 0.3 to a 1.4 molar solution. The anions contained in the aqueous phase of the suspension depend upon the kind of the acid used for the decomposition of the minerals or for the acidification of the suspension. Anions may, for instance, be sulfate ions. However, other ions, such as nitrate or chloride ions, may be contained, in particular if nitric acid or hydrochloric acid has been used for the decomposition of the mineral.

It is also possible to use mixtures of suspensions containing at least one solid or a solid may be added to an acid solution in order to obtain a suspension containing at least one solid.

In particular, during the manufacture of bleaching earths, metal ions having a valency of at least 2 are formed from iron and/or aluminium ions which are dissolved from the raw clay when leached with strong acid.

The solids content of the acid suspension containing at least one solid is selected so that the suspension may be processed without problems, for example may be stirred or pumped. Therefore, the suspension should preferably not have a too high viscosity. If swellable minerals are used, such as sodium bentonite, the solids content of the acid suspension is therefore lower and the solids content with non-swellable minerals may be higher. The water content is preferably as low as possible, in order to reduce the amount of waste water. Preferably, the acid suspension containing at least one solid has a solids content of at least 10 weight %. In particular with non-swellable solids, the solids content, in many cases, will be higher than 20 weight %, in particular higher than about 30 weight %.

The acid content of the acid suspension containing at least one solid is mostly determined by the process in which the acid suspension containing at least one solid is formed, for instance during the leaching of minerals. The amount of acid is selected to be so high that a sufficient amount of acid is present towards the end of the leaching, in order to obtain a precipitation of the water glass. If the amount of acid in the suspension is too small prior to the addition of the alkali metal solution, a corresponding amount of acid may be added. Preferably, the acid suspension containing at least one solid, prior to the addition of the alkali metal silicate, has an amount of acid of at least about 2.5 weight %, based upon the weight of the suspension.

The amount of acid of the acid suspension containing at least one solid is preferably supplied by hydrochloric acid and/or sulphuric acid. These acids are common for technical processes. However, other inorganic or organic acids may be contained in the acid suspension containing at least one solid. A further example for a suitable acid is nitric acid. An example for an organic acid is citric acid.

The process of the invention is particularly suitable for the processing of suspensions obtained during the production of highly active bleaching earths. The acid suspension containing at least one solid is obtained by leaching a raw clay with (strong) acid. The raw clay is leached in a manner known per se as it is common in the manufacture of highly active bleaching earths. As raw clays, there may also be used minerals which are commonly used for the manufacture of highly active bleaching earths. All naturally active and non-naturally active raw clays familiar to the person skilled in the art may be used, in particular di- or trioctahedral layer silicates of the serpentine, kaolin- and talcum-pyrophyrillite-group, smectites, vermiculites, illites and chlorites as well as of the sepiolithe-palygorskite-group such as montmorillonite, notronite, saponite and vermiculite or hectorite, beidellite, palygorskite and mixed layers minerals. Obviously, mixtures of two or several of the above materials may be used. For the leaching of the raw clays, mostly sulphuric or hydrochlorite acids are used.

In order to obtain a most homogeneous precipitation, the mixing of the acid suspension containing at least one solid with the alkali metal silicate solution or a solution containing at least on alkali metal silicate preferably is carried out with stirring. In the preferred addition of the acid suspension containing at least one solid to the alkali metal silicate solution, the rate of addition of the acid suspension is preferably selected such that the temperature of the mixture during the addition of the acid suspension does not fall below 70° C. On the other hand, the acid suspension preferably is added at most at a rate such that the dissipation of the reaction heat formed during the neutralization is guaranteed.

The alkali metal silicate solution is preferably a sodium or potassium water glass solution which is preferably used in a 3 to 8% concentration. The water glass has preferably a molar $SiO_2/M_2O$ ratio of >2.0, wherein M is an alkali metal, in particular potassium and/or sodium.

By the mixing of the acid suspension containing at least one solid with the alkali metal silicate solution, the condensation of the silicic acid is induced. During the addition of acid after the precipitation, the amount of acid is selected such that, related to the solids content after the precipitation, it is within a range of preferably at least 5 weight %, most preferably at least 10 weight %.

After separation, the precipitate may be washed, preferably until no soluble alkali metal is contained in the precipitate or in the washing water. Subsequently, the precipitate may be dried, a moisture of preferably less than 15 weight % being adjusted. The drying is carried out in the usual equipment, and the drying temperature should preferably not be higher than 130° C. In some cases, the drying may also be carried out at higher temperatures.

The precipitate obtained according to the process of the invention (bleaching earth product) exhibits, after simple drying, i.e. without calcination, bleaching activities which correspond to or are even superior than those of high performance bleaching earths (HPBE). Thus, the precipitate is mostly not calcined. In indicidual cases, a calcination may be carried out, for example in order to increase the activity of the precipitate.

The bleaching earth products made in this manner may, according to an advantageous embodiment of the invention, processed further by an additional acid activation to form highly efficient degumming agents. It has been shown that the additional acid activation will increase the adsorption efficiency further. To this end, the precipitate is preferably coated with small amounts of an inorganic or organic acid. The amount of acid selected, based upon the dried precipitate and dependent on the acid used, is preferably in a range from about 2 to 20 weight %, most preferably in a range from 3 to 15 weight %. Suitable acids are, for example, sulphuric acid, phosphoric acid or citric acid. The coating may be carried out so that the acid, as an aqueous solution, is sprayed onto the precipitate. The activated precipitate obtained in such manner is then optionally dried again and ground in order to obtain a powder with the desired fineness.

According to a particularly preferred embodiment, the acid activation of the separated and dried precipitate is carried out with a solid organic acid. To this end, the precipitate is intimately mixed with the solid organic acid. The activation may be carried out by mixing the powder-like dry precipitate with the powder-like solid organic acid. After mixing, the product is ready for immediate use. Under dry conditions, it may be stored for several months. The mixing may also be carried out in such a way that the solid organic acid is ground together with the dried precipitate. By this embodiment of the process, a very uniform mixture is obtained. As solid organic acids, preferably organic acids are used which are at least dibasic, which e.g. comprise at least two carboxyl groups. Such carboxylic acids are normally present in solid form at normal conditions, i.e. at room temperature and normal pressure. Particularly suitable acids are oxalic acid and citric acid. However, the selection should not be limited to the carboxylic acids mentioned. Other suitable acids include tartaric acid, succinic acid, malonic acid and malic acid. However, oxalic acid and citric acid are easily available and may be obtained in large amounts which is of importance under economical aspects. In particular, citric acid is acceptable for use in foods which is important in particular for the raffination of edible oils and fats. The precipitate, re-activated with acid, preferably with organic acid, may also be used as bleaching earth, in particular for the discoloration of oils and fats.

The precipitate obtained with the process according to the present invention has a high adsorption capacity, in particular in the raffination of vegetable and animal oils and fats. Therefore, a subject of the invention is also an adsorbent which may be obtained with the above-described process. If a suspension obtained in the manufacture of highly active bleaching earths upon leaching the raw clays with a strong acids is used according to the invention, the adsorbent obtainable according to the invention preferably has a pore volume of more than 0.4 ml/g, preferably more than 0.5 ml/g, and a specific surface area of more than 250 $m^2/g$, in particular about 300 to 600 $m^2/g$, and a cation exchange capacity (CEC) of more than about 20 meq/100 g.

Furthermore, a subject of the invention includes the use of such an adsorbent as bleaching earth, in particular for the raffination of vegetable and animal oils and fats, and the use of the adsorbent, optionally after additional treatment with acid(s), as degumming aid for the degumming of oils and fats.

The invention is further illustrated by the examples.

If in the examples a typical bleaching earth fineness is referred to, such fineness is understood in which the dry sieve residue on a sieve having a mesh size of 63 μm is 20 to 40 weight %, and the dry sieve residue on a sieve having a mesh size of 25 μm is 50 to 65 weight %.

EXAMPLES

Description of the Methods of Analyses

1. Surface Area/Pore Volume

The surface area was measured with a fully automized nitrogen porosimeter of Micromeritics, Type ASAP 2010, according to DIN 66131. The pore volume was determined using the BJH method (E. P. Barrett, L. G. Joyner, P. P. Halenda, J. Am. Chem. Soc. 73 (1951) 373).

2. Pore Volume

The pore volume was determined according to the $CCl_4$ method (H. A. Benesi, R. V. Bonnar, C. F. Lee, Anal. Chem. 27 (1955), page 1963). To determine the pore volume, defined partial $CCl_4$ vapour pressures were set by mixing $CCl_4$ with paraffin.

3. Analysis of the Oils

The colour numbers in oils (Lovibond-numbers) were determined according to AOCS Cc 13b-25. The determination of chlorophyll A was carried out according to AOCS Cc 13d-55.

The oxidation stability of the oils was tested using the analysis method AOCS Cd 12b-92 (AOM: active oxygen method). The proportion of soap in oils was determined according to AOCS Cc 17-95. AOCS Cd 8-53 was used to determine the peroxide number. The content of metals and phosphorous in the oils was determined by ICP-analysis.

4. Water Content

The water content of the products at 105° C. was determined using the method DIN/ISO-787/2.

5. Elemental Analysis

The analysis is based on a total decomposition of the minerals or the corresponding semi-synthetic bleaching earth products. After the solid had been brought into solution, the individual components were analysed and quantified with specific analysis methods, such as ICP-spectroscopy.

6. Cation Exchange Capacity

To determine the cation exchange capacity (CEC), the layer silicate to be tested was dried at 150° C. for 2 hours. Then, the dried material was refluxed with an excess of aqueous 2N $NH_4Cl$ solution and reacted. After a standing time of 16 hours at room temperature, the product was filtered, the filter cake was washed, dried and ground, and the $NH_4$ content in the layer silicate was analysed by nitrogen determination (CHN-analyzer of Leco). The proportion and the kind of exchanged metal ions in the filtrate was determined by ICP spectroscopy.

MANUFACTURING EXAMPLES

1. Preparation of a Semi-Synthetic Neutralized Bleaching Earth (SSN)

Prior to the synthesis, a 5 weight % water glass solution was produced. To this end, 1.084 kg $NaSiO_3$ solution (dry weight 489 g) were diluted with 8.69 l water. A water glass solution was used, in which the $SiO_2/Na_2O$ ratio was 2.6, and which contained 45.1 weight % solid. The water glass had the following composition: 23.9 weight % $SiO_2$, 9.19 weight % $Na_2O$.

1.700 kg of a hot activation suspension from a typical bleaching earth production was added to the dilute water glass solution. This suspension was prepared by boiling a montmorillonite-containing raw clay with 45 weight % sulphuric acid (based on the solid content of the raw clay) for 8 hours and had a solid content of 30 weight %. The combination of the water glass and the activation slurry was carried out under moderate stirring until a pH of 6 had been reached. Care was taken that the temperature did not drop below 70° C. during the neutralization. The resulting mixture was contacted with 10 weight % concentrated $H_2SO_4$ (based on the solid in the neutralized solution) and heated to boiling temperature for 2 hours. A pH of about 2.5 was reached. Subsequently, the resulting mixture was separated by filtration and the filtered material was washed with a total of 7.78 l water. The resulting solid was pre-dried to about 30 weight % and ground in a hammer mill to a typical bleaching earth fineness (dry sieve residue on 63 μm sieve 20 to 40 weight %). Subsequently, the bleaching earth powder was dried to a water content of about 10 weight %. This bleaching earth product will hereinafter be called "SSN".

The cation exchange capacity (CEC) of SSN was 41.2 meq/g. The exchangeable cations are summarized in table Ia. The elemental analysis of SSN is summarized in table Ib.

TABLE Ia

| Exchangeable cations "SSN" (meq/g) | |
|---|---|
| Na | 8.5 |
| K | 3.4 |
| Ca | 4.8 |
| Mg | 3.3 |
| Fe | 0.9 |
| Al | 2.4 |

TABLE Ib

| Elemental analysis of "SSN" (weight %) | |
|---|---|
| $SiO_2$ | 79.5 |
| $Fe_2O_3$ | 2.4 |
| $Al_2O_3$ | 6.1 |
| MgO | 1.1 |
| CaO | 0.45 |
| $K_2O$ | 1.2 |
| $Na_2O$ | 0.90 |
| $TiO_2$ | 0.33 |
| Loss on ignition | 6.8 |

2. Coating of SSN with Phosphoric Acid
(Preparation of SSP)

A part of the bleaching earth product SSN obtained in example 1 was coated with 10 weight % phosphoric acid (58 weight %) by uniform spraying. The product thus produced will hereinafter be called "SSP".

3. Coating of SSN with Sulphuric Acid
(Preparation of SSS)

In analogy to the production example 2, a bleaching earth product "SSS" was prepared by coating the bleaching earth product SSN from example 1 with 3 weight % sulphuric acid (84.2 weight %) by spraying.

4. Mixing of SSN with Citric Acid
(Preparation of SSC)

6.4 weight % citric acid (citric acid anhydrate) in typical bleaching earth fineness was added to the bleaching earth product of example 1. The two solids were homogeneously mixed by vigorous shaking in a closed glass container.

TABLE II

Product analysis of Bleaching earth products and comparison with commercial products

| Product | BET surface m²/g | Pore volume ml/g |
|---|---|---|
| SSN | 370 | 0.685 |
| SSP | 276 | 0.579 |
| SSS | 362 | 0.671 |
| SSC | 366 | 0.676 |
| Tonsil ® Supreme 126 FF | 301 | 0.504 |
| TriSyl ® 3000 | 441 | 1.275 |
| Sorbamol ® 420 FF | 129 | 0.209 |

The products Tonsil® Supreme 126 FF, Sorbamol® 420 FF (both Süd-Chemie de Mexico) and TriSyl® 3000 (W. R. Grace) mentioned in table II are typical commercially available representatives of bleaching earths or adsorbents. Tonsil® Supreme 126 FF is a highly active bleaching earth (HPBE, "high performance bleaching earth") on the basis of montmorillonite; TriSyl® 3000 and Sorbamol® 420 FF are synthetic degumming aids.

5. Comparison of the Waste Water of SSN and Conventional Bleaching Earth Products In table III the amounts of waste water and of the salt concentration dissolved therein, from the preparation of SSN, were compared with the waste water obtained in the production of a bleaching earth on the basis of montmorillonite according to the prior art processes (activation of montmorillonite with 45 weight % sulphuric acid for 8 h).

TABLE III

Amounts of waste and salt loads

| | SSN | Bleaching earth on the basis of montmorillonite |
|---|---|---|
| Volume of waste water per kg of product (l) | 2.5 | 2.0 |
| free $H_2SO_4$ in the waste water (g/l) | 5.6 | 45 |
| PH | 2.3 | 1.1 |
| Amount of salt in waste water (g/l) | 40 | 151 |
| Amount of solid after waste water neutralization (g/l) | 15 | 192 |

Despite of the somewhat increased waste water volume, the waste water in the process according to the present invention contains less dissolved salts (40 vs. 151 g/l). The waste water has a higher pH and a lower amount of free $H_2SO_4$. Accordingly, this waste water is less corrosive than the waste water from the prior art production process. After the neutralization of the waste water with lime milk, the present process only yields 15 g/l solid to be disposed of, whereas the prior art process yields 192 g/l.

In the process of the present invention, a significantly smaller salt load in the waste water is obtained with similar process conditions.

1. Bleaching of Canola Oils with SSN

Degummed canola oil was bleached at 100° C. for 30 min under vacuum using the bleaching earth obtained in example 1. For the bleaching, 0.4 weight % bleaching earth were metered to the heated oil. For comparison of the bleaching results with the prior art, the commercial bleaching earth product Tonsil® Supreme 126 FF and the commercial silica gel product TriSyl® 3000 were used. The bleaching results are summarized in table IV. They show the equivalency of SSN over a bleaching earth on the basis of montmorillonite and show the inferior bleaching effect of silica gels.

TABLE IV

Bleaching of canola oil

| | Dosages | Lovibond color (5¼") | |
|---|---|---|---|
| Product | (%) | red | yellow |
| SSN | 0.8 | 5.3 | 70 |
| Tonsil ® Supreme 126 FF | 0.8 | 5.4 | 70 |
| TriSyl ® 3000 | 0.8 | 3.2* | 70* |

*1" cuvette

2. Degumming of Soybean Oil with the Products of the Invention

A non-refined raw soybean oil was treated at 70° C. for 20 min with the products listed in table V. After the treatment time, the solid was filtered off, and the oil was analysed for soap and heavy metal content. Table V illustrates that the products of the invention remove soaps and heavy metals significantly better than commercially available products.

TABLE V

Degumming of soybean oil

| | Peroxide | Soaps | Metals und phosphorous (ppm) | | | | |
|---|---|---|---|---|---|---|---|
| | (meq/kg) | (ppm) | Cu | P | Ca | Fe | Mg |
| Raw oil | 10.8 | 240 | <0.05 | 8.20 | 2.50 | <0.05 | 1.46 |
| SSS | 0 | 15.2 | <0.05 | 4.10 | 0.40 | <0.05 | 0.19 |
| SSC | 0 | 22.7 | <0.05 | 4.60 | 0.52 | <0.05 | 0.27 |
| SSP | 0 | 7.5 | <0.05 | 4.00 | 0.37 | <0.05 | 0.15 |

TABLE V-continued

Degumming of soybean oil

| | Peroxide (meq/kg) | Soaps (ppm) | Metals und phosphorous (ppm) | | | | |
|---|---|---|---|---|---|---|---|
| | | | Cu | P | Ca | Fe | Mg |
| Sorbamol ® 420 FF | 0 | 44.5 | <0.05 | 4.50 | 0.50 | <0.05 | 0.25 |
| TriSyl ® 3000 | 0 | 29.7 | <0.05 | 4.30 | 0.45 | <0.05 | 0.23 |

3. Degumming and Bleaching of Soybean Oil

Raw soybean oil was pre-treated with 0.025 weight % degumming agent at 70° C. for 20 min. Subsequently, 0.5 weight % bleaching earth of the type Tonsil® Supreme 126 FF were added, and the oil was treated at 115° C. for 30 min under a vacuum of 60 mm Hg. After filtering off the adsorbent, the bleached oil is obtained which was subsequently deodorized at 270° C. for 120 min and a pressure of 2 mm Hg. Table VI shows the analysis of the bleached and deodorized oils.

TABLE VI

Degumming and bleaching of soybean oil

| | bleaching | | | Deodorization | | | | | | | | |
|---|---|---|---|---|---|---|---|---|---|---|---|---|
| | Lovibond 5¼" | | | Lovibond 5¼" | | | Stability[1] | Metals and phosphorous | | | | |
| | red | yellow | Chlorophyll | red | yellow | Chlorophyll | 97.8° C.[1] | Cu | P | Ca | Fe | Mg |
| Raw oil | 7.8 | 70.0 | 0.62 | — | — | — | — | <0.05 | 9.7 | 0.14 | 0.50 | 0.23 |
| SSN + Tonsil ® Supreme 126 | 3.6 | 70.0 | 0.07 | 1.0 | 9.0 | 0.00 | 8.7 | <0.05 | 1.15 | <0.06 | <0.06 | <0.1 |
| SSS + Tonsil ® Supreme 126 | 3.8 | 70.0 | 0.09 | 1.0 | 6.8 | 0.00 | 14.2 | <0.05 | 1.01 | <0.06 | <0.06 | <0.1 |
| SSC + Tonsil ® Supreme 126 | 4.1 | 70.0 | 0.11 | 1.0 | 7.5 | 0.03 | 13.3 | <0.05 | 2.00 | <0.06 | <0.06 | 0.1 |
| TriSyl ® 3000 + Tonsil ® Supreme 126 | 4.1 | 70.0 | 0.12 | 1.0 | 8.5 | 0.03 | 7.3 | <0.05 | 1.70 | <0.06 | <0.06 | <0.1 |

[1]AOCS Cd 12b-92

The results of example 3 show that the products according to the invention may be used in the combination of degumming and bleaching of raw oils with particularly high efficiency. In particular, the (oxidation) stability of the deodorized oil reaches, to a certain part, significantly better values as with the degumming/bleaching of prior art products.

The invention claimed is:

1. Process of preparation and processing an acid suspension containing at least one solid, comprising leaching a raw clay with acid to obtain the acid suspension containing at least one solid, said acid suspension having a solid content of at least 10 wt. %, mixing the suspension containing at least one solid with an alkali metal silicate solution to form a mixture, whereby the pH of the mixture is adjusted to a pH of more than 4 to produce a precipitate, and separating the resulting precipitate, formed from the mixing of the alkali metal silicate solution and the acid suspension containing at least one solid, from the suspension.

2. Process according to claim 1, characterized in that the pH of the mixture is adjusted to a pH of more than 6.

3. Process according to claim 1 further comprising, after mixing, the mixture is further acidified to a pH of less than 4 by the addition of an acid.

4. Process according to claim 1, characterized in that the mixture is heated prior, during or after the formation of the precipitate to a temperature of more than 70° C.

5. Process according to claim 1, characterized in that the acid suspension contains metal ions having a valency of at least 2 in dissolved form.

6. Process according to claim 5, characterized in that the metal ions having a valency of at least 2 comprise iron or aluminum ions.

7. Process according to claim 1, characterized in that the acid suspension containing at least one solid has an acid content of at least 2.5 weight %, based on the weight of the suspension.

8. Process according to claim 1, characterized in that the acid suspension contains hydrochloric acid and/or sulphuric acid.

9. Process according to claim 3, characterized in that the further acidified mixture is heated for at least one hour.

10. Process according to claim 3, characterized in that the further acidified mixture is heated to a temperature of more than 70° C.

11. Process according to claim 3, characterized in that the further acidified mixture is heated to boiling.

12. Process according to claim 1, characterized in that the raw clay comprises a montmorillonite-containing clay.

13. Process according to claim 1, characterized in that the alkali metal silicate solution has a solid content of at least 2 weight %.

14. Process according to claim 1, characterized in that the alkali metal silicate solution comprises a water glass solution with a molar ratio of $SiO_2/M_2O > 2.0$, wherein M comprises an alkali metal.

15. Process according to claim 1, characterized in that the temperature of the mixture is maintained above 70° C. during the mixing of the alkali metal silicate solution and the acid suspension containing at least one solid.

16. Process according to claim 3, characterized in that the acid is added in an amount of at least 5 weight %.

17. Process according to claim 1, characterized in that the separated precipitate is dried to a moisture content of less than 15 weight %.

18. Process according to claim 17, characterized in that the separated and dried precipitate is subjected to acid activation.

19. Process according to claim 18 characterized in that the separated and dried precipitate is mixed with a solid organic acid.

20. Process according to claim 19 characterized in that the solid organic acid comprises citric acid.

* * * * *